United States Patent
Mitchick et al.

(10) Patent No.: US 9,133,534 B2
(45) Date of Patent: Sep. 15, 2015

(54) MAGNETIC AND ELECTRICAL PROCESSING OF METALS, METAL ALLOYS, METAL MATRIX COMPOSITE PARTS AND COMPONENTS

(75) Inventors: Jason Paul Mitchick, Royal Oak, MI (US); Raju Karthik, Novi, MI (US); Mauricio Gonzalez-Rocha, Novi, MI (US); Jerzy Hieronim Sokolowski, Windsor (CA)

(73) Assignees: RASSINI FRENOS, S.A. DE C.V., Plymouth, MI (US); THE UNIVERSITY OF WINDSOR (CA)

( * ) Notice: Subject to any disclaimer, the term of this patent is extended or adjusted under 35 U.S.C. 154(b) by 350 days.

(21) Appl. No.: 13/710,948

(22) PCT Filed: Jun. 10, 2011

(86) PCT No.: PCT/US2011/039935
§ 371 (c)(1),
(2), (4) Date: Dec. 12, 2012

(87) PCT Pub. No.: WO2011/156685
PCT Pub. Date: Dec. 15, 2011

(65) Prior Publication Data
US 2014/0283952 A1    Sep. 25, 2014

Related U.S. Application Data

(60) Provisional application No. 61/354,000, filed on Jun. 11, 2010.

(51) Int. Cl.
*C21D 10/00* (2006.01)
*C21D 9/28* (2006.01)
(Continued)

(52) U.S. Cl.
CPC ........ *C21D 10/00* (2013.01); *C21D 9/02* (2013.01); *C21D 9/28* (2013.01); *F16D 65/125* (2013.01); *F16F 1/021* (2013.01)

(58) Field of Classification Search
USPC ........... 148/108, 95, 525, 526, 408, 565, 566, 148/567
See application file for complete search history.

(56) References Cited

U.S. PATENT DOCUMENTS 4,158,873 A * 6/1979 Schroeder et al. ............ 361/149
4,873,605 A * 10/1989 Drits et al. .................... 361/143

(Continued)

FOREIGN PATENT DOCUMENTS

| | | |
|---|---|---|
| CN | 1415056 | 4/2003 |
| JP | 59041418 A | 3/1984 |

(Continued)

OTHER PUBLICATIONS

Office Action regarding related JP App. No. 2013-514382; dated Mar. 11, 2014; 9 pages.

(Continued)

*Primary Examiner* — Deborah Yee
(74) *Attorney, Agent, or Firm* — Cantor Colburn LLP (57) ABSTRACT

A method of processing a metal for improved damping of a metal part is provided. The method comprises placing the metal part inside a current carrying coil and closing a circuit for to apply current to the coil, thus producing a magnetic field in the metal part. Thereafter, the circuit is opened for a time and then the circuit is closed a second time to apply a second current to the coil. The circuit is then opened a second time and the metal part is removed from the current carrying coil.

17 Claims, 7 Drawing Sheets

(51) Int. Cl.
   *F16D 65/00* (2006.01)
   *C21D 9/02* (2006.01)
   *F16D 65/12* (2006.01)
   *F16F 1/02* (2006.01)

(56) References Cited

U.S. PATENT DOCUMENTS

| | | |
|---|---|---|
| 5,032,947 A | 7/1991 | Li et al. |
| 6,505,716 B1 * | 1/2003 | Daudi et al. ............... 188/250 B |
| 7,253,381 B2 | 8/2007 | Loveless et al. |
| 2007/0138169 A1 | 6/2007 | Tanaka et al. |

FOREIGN PATENT DOCUMENTS

| | | | | |
|---|---|---|---|---|
| JP | 60162728 A | | 8/1985 | |
| JP | 62174388 A | | 7/1987 | |
| JP | 401184234 A | * | 7/1989 | ............ 148/568 |
| JP | 08134545 A | | 5/1996 | |
| JP | 2005060800 A | | 3/2005 | |
| JP | 2006322071 A | | 11/2006 | |
| RU | 2024623 C1 | | 12/1994 | |
| RU | 2068003 C1 | | 10/1996 | |
| RU | 2153006 C1 | | 7/2000 | |
| RU | 2260725 C2 | | 9/2005 | |
| RU | 2359431 C2 | | 6/2009 | |
| SU | 1086021 A1 | | 4/1984 | |
| WO | 0133095 A2 | | 5/2010 | |

OTHER PUBLICATIONS

Office Action regarding related App. No. CN201180034927.1; dated Nov. 19, 2013; 10 pgs.

International Preliminary Report on Patentability; International Application PCT/US2011/039935; International Filing Date Jun. 10, 2011; Mailing Date Dec. 14, 2012; 7 pages.

Russian Office Action for Application No. 2012155520 dated Jun. 27, 2014; English translation attached; 8 pages.

International Search Report; International Application No. PCT/US2011/039935; International Filing Date Jun. 10, 2011; Mailing Date Oct. 3, 2011; 2 pages.

* cited by examiner

MAGNETIC AND ELECTRICAL PROCESSING OF METALS, METAL ALLOYS, METAL MATRIX COMPOSITE PARTS AND COMPONENTS

CROSS REFERENCE TO RELATED APPLICATION

This application is a 35 USC 371 Application of PCT/US11/39935, filed Jun. 10, 2011 which claims the benefit of U.S. Provisional application, Ser. No. 61/354,000, filed Jun. 11, 2010, the contents of each of which are incorporated herein by reference thereto.

BACKGROUND OF THE INVENTION

Noise, in the form of brake squeal, is one of the highest warranty concerns for all automotive OEMs. Brake rotors form part of the friction interface which generate the vibrating frequencies. Damping of the resonant frequencies of the components can be achieved by system damping or material damping. Material damping involves internal friction generated in the material in response to a stress. Magneto-mechanical damping is one of the several mechanisms that generate internal friction. It is desirable to increase the damping capacity of rotors, which will reduce vibration and noise from the rotor during braking, or other metal parts when subject to external forces. As used herein, the phrase "Metal parts" means ferrous metals, ferrous metal alloys, ferrous metal matrix composites, ferrous sintered materials, non-ferrous metals, non-ferrous metal alloys, non-ferrous sintered materials, and non-ferrous metal matrix composite parts and components. As used herein, the term "metal matrix composite" refers to all traditional variations including metals with cast-in inserts and reinforcements.

SUMMARY OF THE INVENTION

The invention uses magneto-mechanical damping on metal parts to improve internal friction of the part for better in-service performance.

According to one aspect of the invention, a method of processing metal for improved damping of a metal part is provided. The method includes placing said metal in electrical contact with a current carrying coil and closing a circuit to apply current to said coil producing a magnetic field in said metal. The circuit is thereafter opened and then closed a second time to apply a second current to the coil. The circuit is opened a second time and the metal is removed from the current carrying coil.

According to another aspect of the invention, a method of processing a metal for improved damping of a metal part is provided. The method comprises placing the metal in a controlled magnetic field that has one or more sets of poles, and the magnetic field is modulated with a defined process.

According to still yet another aspect of the invention, a brake rotor comprising a braking surface is provided. The brake rotor has at least a 5% reduction in Q-factor due to the magnetic and/or electrical processing described herein. In a non-limiting embodiment, the brake rotor may be comprised of ferrous or non-ferrous metals, alloys or metal matrix composites.

Still yet in another aspect of the invention, a suspension spring is provided. The fatigue strength of the suspension spring is increased by at least 5% due to the magnetic and/or electrical processing described herein.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The invention uses magneto-mechanical damping on metal parts, as will be described in detail herein with reference to brake rotors, to improve internal friction of a brake rotor for better performance. It will occur to others that the applications described may be suitable to other ferrous and non-ferrous metal parts, metal alloys or metal matrix composites. In another non-limiting embodiment of this invention the magnetic field can also be applied to raw metal part material prior to part and component manufacturing. For example, the magnetic field could be applied to ingots of raw material prior to a manufacturing process such as the turning of a brake rotor.

By identifying the factors that can affect damping, the applicants have discovered new and useful ways of manipulating those factors to control damping.

Natural Frequency

Natural frequency of vibration of a system is denoted by the formula $$fn = \frac{1}{2\pi} \frac{\sqrt{K}}{\sqrt{M}}$$

where K is the stiffness of the part and is proportional to the Young's Modulus of the part.

M is the mass of the part which is proportional to the density of the part.

As can be seen from the equation, frequency can be increased by increasing the stiffness or decreasing the mass or a combination of both.

In order to increase the stiffness with the same geometry, the Young's Modulus has to be increased. In order to decrease the mass with the same geometry, the density has to be reduced.

Modal Q Factor

Damping in a part is a measure of the rate at which the energy is dissipated when the response dies down. The modal Q factor compares the frequency at which a system oscillates to the rate at which it dissipates its energy. A higher Q indicates a lower rate of energy dissipation relative to the oscillation frequency. The modal Q factor is calculated by applying an impact force to the part and measuring the free decay of frequency response of the sound using a microphone. Since power and energy are proportional to the square of the amplitude of the oscillation, the bandwidth on an amplitude-frequency graph should be measured to $1/\sqrt{2}$ of the peak or approximately −3 db, as seen from the graph of FIG. 12. FIG. 13 shows the response of the example in FIG. 12 decaying after the initial impact.

Figure 12:
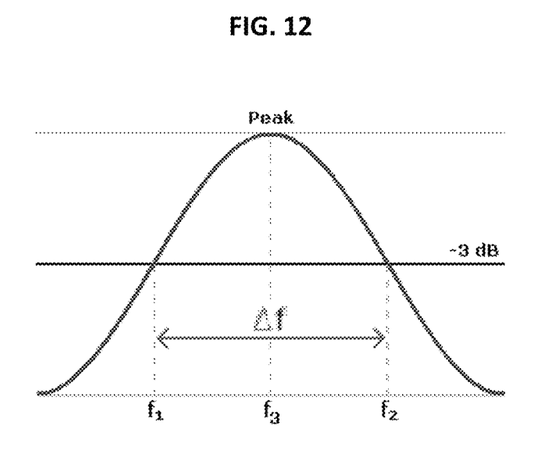
FIG. 12 illustrates an example of an amplitude-frequency graph showing a response after impact.
Figure 13:
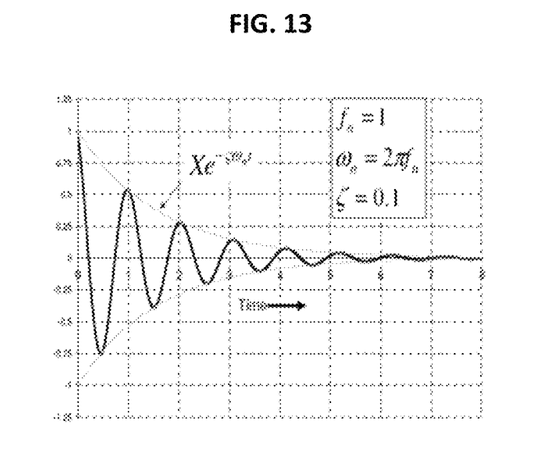
FIG. 13 illustrates an example of the response in FIG. 12 decaying after an initial impact.

In FIG. 12, f3 is the natural frequency and f1 and f2 are the frequencies at 3dB drop in the amplitude of the frequency response function (FRF). The width of the peak determines the damping in the part. The higher the difference between f1 and f2, the more damping is present in the part.

$$Q = \frac{f_n}{(f_1 - f_2)}$$

Figure 14:
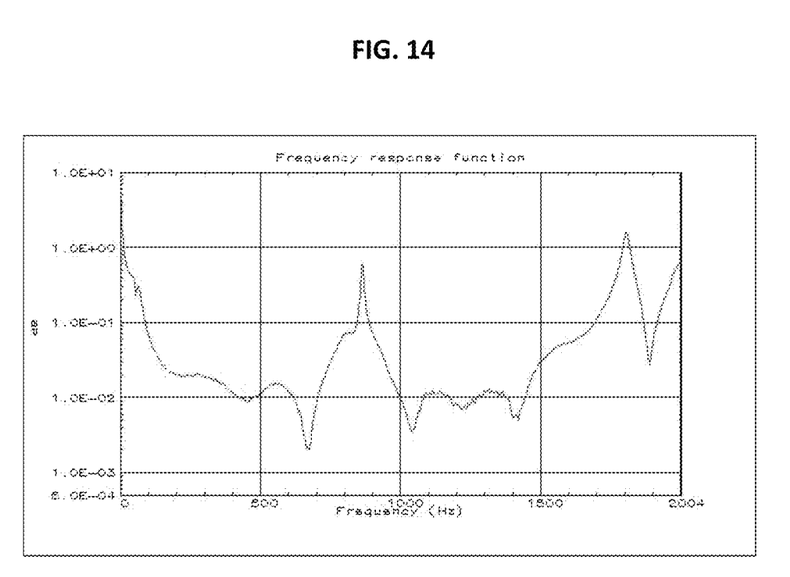
FIG. 14 illustrates an example of a frequency response function used for a damping calculation.

Q=√K.√M where K is the stiffness, M is the mass and cc is called the viscous damping coefficient which is the mathematical modeling of the ratio of damping force to the velocity and is an inherent property of the material. FIG. 14 shows a measured FRF which is used for the damping calculation.

Modal Damping Factor

The modal damping factor or modal damping ratio is the ratio of the damping in the part to the critical damping value. Critical damping value is the value at which there is no oscillation and the amplitude dies down without going through any oscillation.

$$\text{Damping factor } v = c/cc = \frac{c}{2\sqrt{K} \cdot \sqrt{M}}$$

cc=2√K.M is the critical damping value
where K is the stiffness, M is the mass and c is the damping coefficient Damping factor is related to the Q factor by the following formula $$v = \frac{1}{2Q}$$

or if represented as a percentage:

$$v = -\frac{100}{2Q}$$

This invention improves the quality of brake rotors and is expected to significantly reduce brake squeal warranty returns for original equipment, and after-market manufacturers by as much as 35%. This invention will also be applicable to repair and service centers that can process metal parts and components in the field of service for the purpose of improving noise performance. The invention increases the material damping properties of cast iron and cast iron brake rotors. This increase in damping allows the rotor material to absorb and dissipate more vibration energy reducing the tendency of the vibration to manifest itself as audible brake squeal. Increased damping is achieved by increasing the magneto-mechanical portion of the damping properties by manipulating the magnetic domain structure. Closure domains absorb vibrational energy, and increased numbers of closure domains and movement of the non 180° domain walls produces higher damping effects in the processed materials and metal parts. For example, in grey iron it is expected that increased damping is achieved by increasing the magneto-mechanical portion of the damping properties by increasing the volume fraction of 90 degree walls through magnetic processing.

The size and volume fraction of the closure domains and the ease of non-180 degree domain wall movement govern the extent to which magneto-mechanical damping can be improved. Magnetically processing a rotor by electrical discharge machining (EDM) of the rotor is described for example in PCT Patent Application No. PCT/US2010/001096 filed Apr. 12, 2010, the disclosure of which is incorporated by reference herein. EDM achieves a significant improvement in damping characteristics. In addition, magnetizing a rotor, for example in a coil (longitudinal or circular magnetization) using a magnetizing system will also significantly improve damping characteristics. It will be appreciated by one skilled in the art that other methods that generate a magnetic field which may include but are not limited to, the use of permanent magnets, electromagnetic fields, current directly through the part, or any combination thereof may generate similar results.

Referring now to the Figures, where the invention will be described with reference to specific embodiments, without limiting same, magnetic processing of the brake rotor can increase material damping and reduce brake noise. During testing on rotors machined using the EDM process, it was found that this processing improved the material damping properties by about 40% over non-EDM processed brake rotors.

Figure 1:
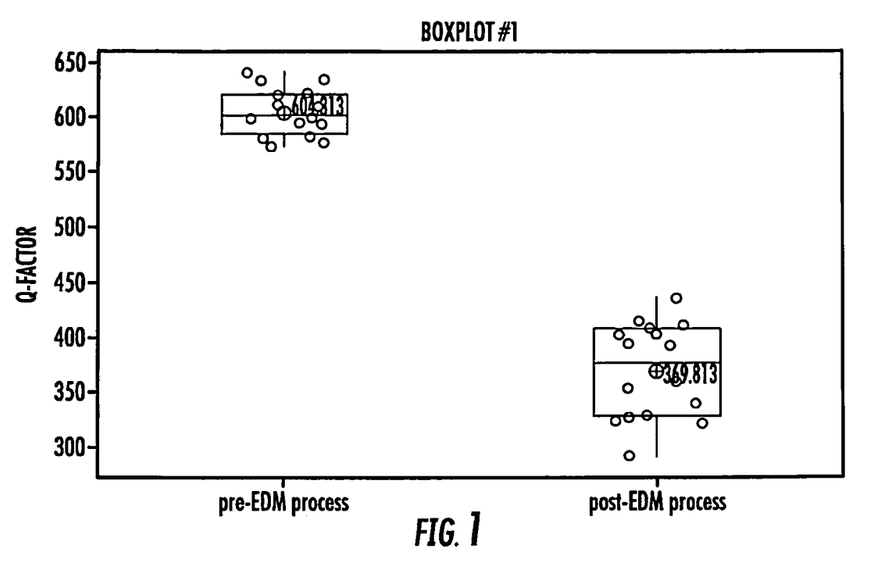
FIG. 1 is a graphical representation of one aspect of the invention in comparison to the prior art.
Figure 2:
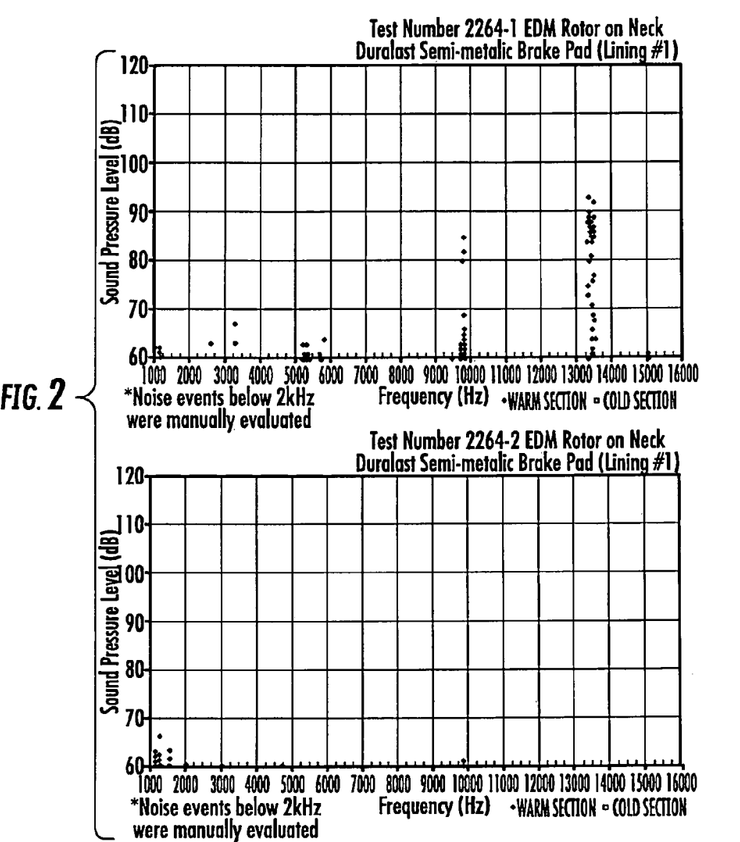
FIG. 2 is graphical representation of another aspect of the invention in comparison to a baseline rotor.

Referring now to FIG. 1, EDM processing reduced the Q-factor measurement of the rotor material from 604 to 370. The rotors with a reduced Q-factor (as shown in the example of FIG. 1, the Q-factor being less than 400) were then tested on a dynamometer using an industry standard noise test specification (SAE J2521). This noise testing was performed on a baseline rotor without EDM processing and a rotor with reduced Q-factor by EDM processing. The results are shown in FIG. 2. Each data point represents one stop which made brake noise during the test. This test demonstrated that the brake noise at about 9.7 kHz was reduced approximately 96%. Also during this test, brake noise measured at about 13.5 kHz was eliminated.

Figure 3:
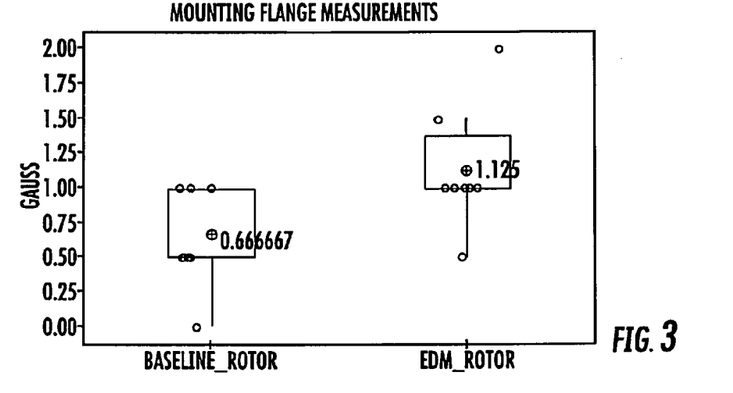
FIG. 3 is a graphical representation of the invention which has had a magnetic field applied to it as compared to the prior art.

Investigation of the EDM process shows that the EDM processing increases the contribution of magneto-mechanical damping to the overall damping property of the rotor material. The electrical processing of the metal parts in the EDM machine produces a magnetic field in the rotor resulting in an improved magnetic domain structure, which is responsible for increased magneto-mechanical damping. As described herein, in grey iron it is expected that increased damping is achieved by increasing the magneto-mechanical portion of the damping properties by increasing the volume fraction of 90 degree walls through magnetic processing. As seen in FIG. 3, the magnetic field strength of a baseline rotor and the magnetic field of the EDM processed rotor showed a change as compared to the baseline rotor by a Factor of about 2 on average, resulting in increased damping for the EDM processed rotor.

Figure 4:
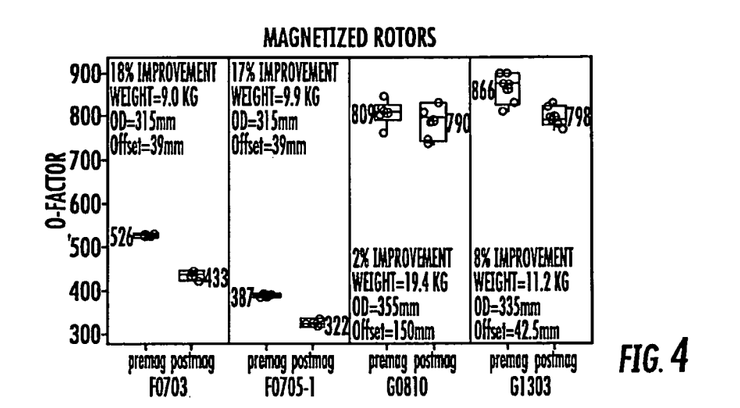
FIG. 4 is an illustration showing magnetized rotors in accordance with an aspect of the invention.
Figure 5:
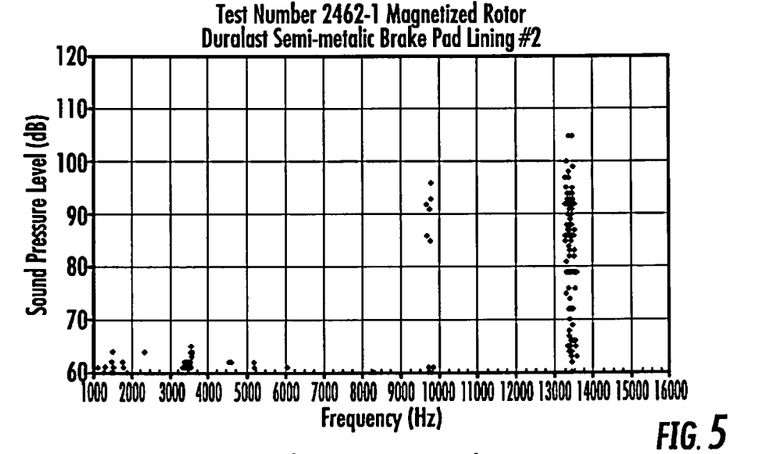
FIG. 5 is an illustration of noise test results of a brake rotor in accordance with the prior art.
Figure 6:
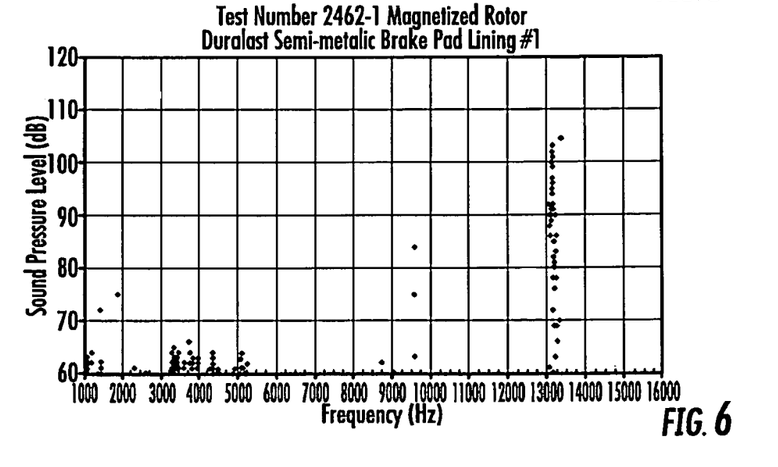
FIG. 6 is an illustration of noise test results of a brake rotor in accordance with the invention.
Figure 7A:
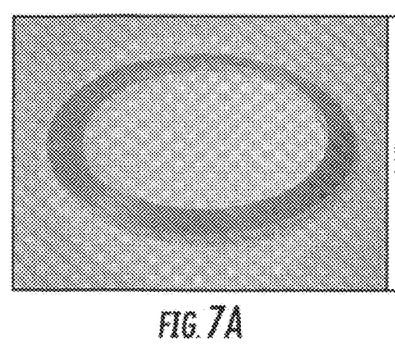
FIG. 7A shows one aspect of the invention as applied to aluminum.
Figure 7B:
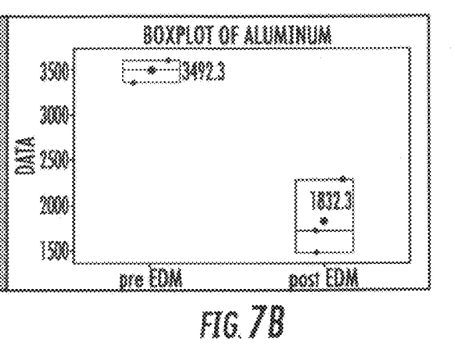
FIG. 7B shows a graphical representation of another aspect of the invention in comparison to the prior art, showing the invention as applied to aluminum.

Referring now to FIG. 4, a comparison of Q-factor on a rotor (both pre-magnetization and post-magnetization) is shown. Parts were magnetized in a magnetic field. Gauss measurements show a magnetization of ~10 Gauss. Q-factor measurements show that the magnetization reduced the Q-factor of rotors by about −2% and up to −20%. The magnetized part and a baseline part were then run through the noise test (SAE J2521) on the dynamometer. FIG. 5 shows noise test results from a brake dynamometer-baseline, while FIG. 6 shows noise test results from a brake dynamometer-magnetized rotor. The results from this test show about a 70% reduction in noise at ~9.7 KHz, and about a 48% reduction at ~13.5 KHz as shown in FIG. 5 and FIG. 6.

The results show that the manipulation of the magnetic domain structure results in improved damping properties.

Processing of a rotor or a suspension coil (as will be described herein) comprises placing the rotor or suspension coil inside a magnetic field. In one embodiment, current is cycled through the coil[s] producing a magnetic field. In another embodiment, the magnetic field is applied to the rotor or suspension coil by passing current directly through the part by means of contact methods to any electrical circuit. In a non-limiting embodiment, a current of more than 1 amp and about 10,000 amps AC or DC has been used. It is contemplated that the process is also feasible above 10,000 amps—though due to current equipment constraints, Applicant's have not yet tested the process above 10,000 amps. In one non-limiting embodiment, the process uses 3000 amps. In yet another non-limiting embodiment, the current is cycled through the coil in 0.5 second time steps. The cycling occurs at least once, but can occur from three to six individual times. It will appreciated that one skilled in the art that the variable of amperage applied, cycle time, the number of cycles, frequency of current, frequency of the alternating field direction, and strength of the magnetic field may be varied from that disclosed herein. For example the cycle time may vary from the 0.5 seconds disclosed to other cycle times, and alternatively may vary the cycle time between individual cycles of the same part. In addition, the number of cycles may be varied based upon further testing by one skilled in the art. Finally, the variables of cycle time and number of cycles might be related to the amperage applied and/or the strength of the magnetic field applied.

Figure 8:
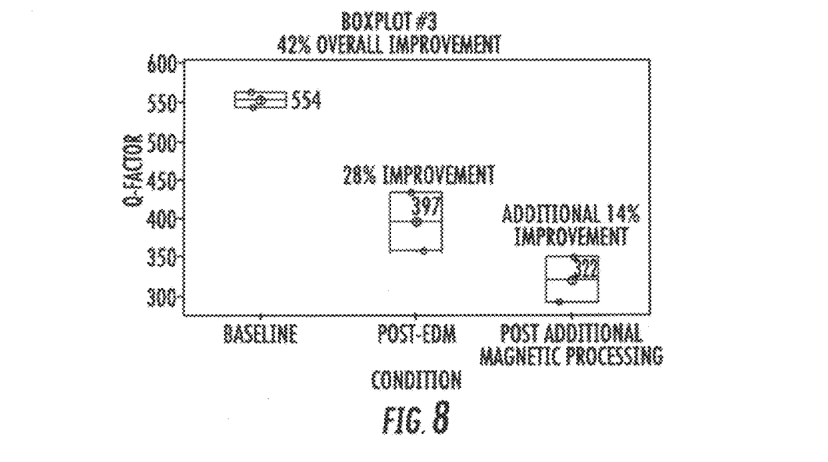
FIG. 8 is a graphical representation of the additive effect of magnetic processing, in accordance with another aspect of the invention.

In other alternative embodiments, the part is removed from the magnetic field and has a residual magnetic field retained in the material of the part. In another embodiment, the magnetic field is allowed to dissipate. In yet another non-limiting embodiment, reversal of magnetic fields also improves damping, for example AC demagnetization which involves multiple field reversals improved damping. In yet another embodiment, performing different magnetic processes in succession produce an additive effect and further increase the amount of damping improvement obtained in the metal as shown in FIG. 8.

Figure 9:
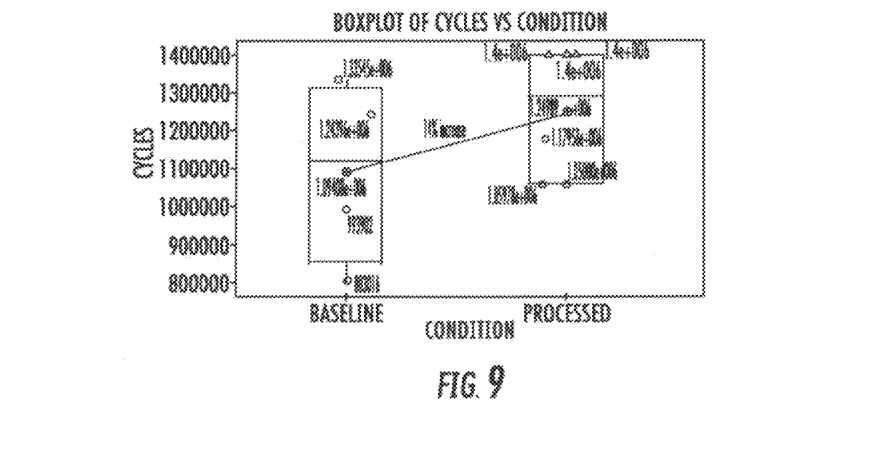
FIG. 9 is a graphical representation of improved fatigue strength, in accordance with yet another aspect of the invention.
Figure 10:
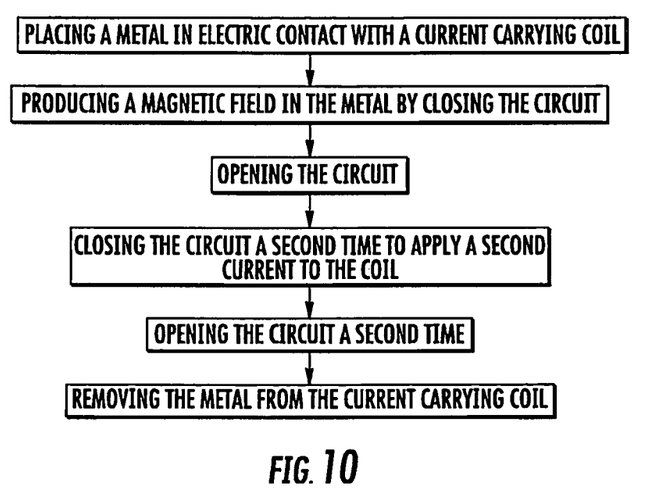
FIG. 10 illustrates a method of processing metal in accordance with one aspect of the invention.
Figure 11:
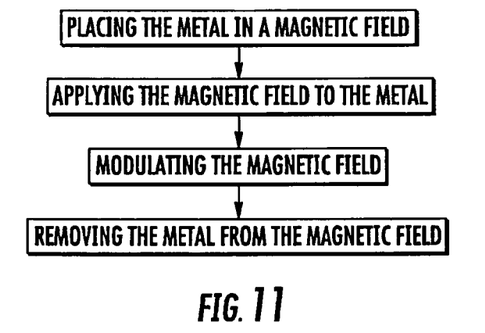
FIG. 11 illustrates a method of processing metal in accordance with another aspect of the invention.

It has also been found that magnetic processing of ferrous materials also produces additional benefits to material properties such as improved fatigue performance. In one non-limiting embodiment, steel suspension springs, in a further non-limiting embodiment, steel suspension coil springs, were magnetically cycled using both EDM and magnetic fields, and then the springs were tested to fatigue failure according to SAE HS 795 Part 2 chapter 5 section 6 of the SAE Spring Design Manual AE-11. The results of this test are shown in FIG. 9, where the number of testing cycles for 10 parts is plotted. Each data point represents the number of cycles each spring encountered until failure. The number of completed testing cycles for the processed parts was increased by 14% on average over the non-processed baseline parts.

Magnetic and electrical processing of metals, alloys, and metal matrix composites has resulted in measurable changes in the properties of these materials when performed at room temperature. In additional experiments we have discovered that by applying a magnetic field to these materials during the solidification process has also resulted in similar measurable changes in the properties of metals, alloys and metal matrix composites. It has been determined that in the transition from liquid to solid, and during the heat treatment process, the formed structures within the metals, alloys, and metal matrix composites have more freedom of movement. Thus, the magnetic field has a greater influence on the as-cast structure and thus the final structure of the materials. Since magnetic and electrical fields impose forces that result in aligning or orienting structural features within metals, alloys, and metal matrix composites, applicant's also explored other systems and processes that act on the metal parts and are influence the orientation of the structure within these materials.

Cryogenic treatment of metals, alloys, and metal matrix composites also create similar measureable changes in the material properties. This was also found to be the case with vibration treatment of metal and metal parts. Magnetic and electro processing materials at cryogenic temperatures achieves better material properties in the final material as did magnetic and electro processing of metal and metal parts while the metals are being vibrated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A method of processing metal for improved damping or fatigue strength of a metal part comprising:
    placing said metal in electrical contact with a current carrying coil;

closing a circuit to apply current to said coil and cycling said current directly into said metal for producing a magnetic field in said metal;
opening said circuit;
closing said circuit a second time to apply a second current to said coil;
opening said circuit a second time; and
removing said metal from said current carrying coil.

2. The method of claim 1, wherein at least one of said applied current and said applied second current is at least 1 amp.

3. The method of claim 2, wherein at least one of said applied current and said applied second current is at least 3000 amps.

4. The method of claim 1, including placing said metal inside said current carrying coil and cycling said current through said coil by opening and closing said circuit at predetermined time intervals.

5. The method of claim 4, wherein at least one of said predetermined time intervals is 0.5 seconds.

6. The method of claim 5, wherein said cycling of said current through said coil is repeated between three and six times.

7. The method of claim 4, wherein said cycling of said current through said coil is repeated between three and six times.

8. The method of claim 1, including removing said metal from said coil with a residual magnetic field remaining in said metal.

9. The method according to claim 1, wherein the metal part is a brake rotor comprising a braking surface having a Q-factor that is reduced by at least 5% compared to said brake rotor before said metal processing.

10. The method of claim 9, wherein said braking surface is machined using an electrical discharge machining process.

11. The method according to claim 1, wherein the metal part is a suspension spring having an increased fatigue performance of at least 5% compared to said suspension spring before said metal processing.

12. A method of processing a brake rotor for improved damping of said brake rotor, the method comprising:
placing said brake rotor in a magnetic field;
applying said magnetic field to said brake rotor;
manipulating a magnetic domain structure of said brake rotor to increase a magneto-mechanical portion of the damping properties of said brake rotor;
modulating said magnetic field; and
removing said brake rotor from said magnetic field.

13. The method of claim 12, wherein said magnetic field includes more than one set of poles.

14. The method of claim 12, further comprising machining said brake rotor using an electrical discharge machining process prior to placing said brake rotor in said magnetic field.

15. The method of claim 12, further comprising increasing closure domains of said brake rotor and increasing a volume fraction of 90° walls of said brake rotor.

16. The method of claim 12, further comprising applying at least one of a cryogenic treatment and a vibration treatment to said brake rotor during said step of applying said magnetic field to said brake rotor.

17. The method of claim 12, further comprising:
providing a liquid metal; and
solidifying said liquid metal to form said brake rotor during said step of applying said magnetic field to said brake rotor.

* * * * *